Aug. 3, 1954

D. COLLINS ET AL 2,685,650

AUTOMATIC STARTING SYSTEM

Filed April 30, 1951

INVENTOR.
DOUGLAS COLLINS
GEORGE R. ERICSON
BY

*George R. Ericson*

ATTORNEY

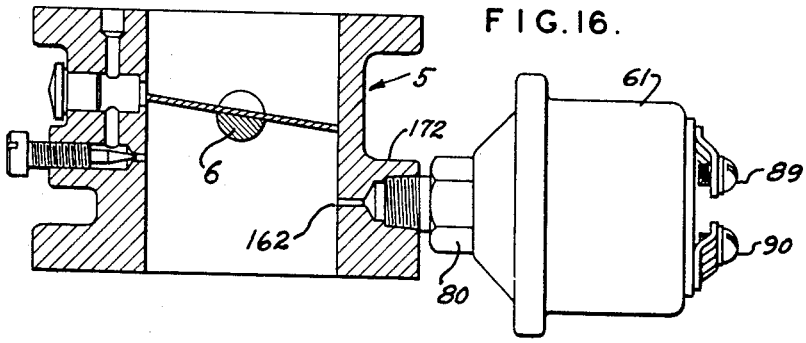
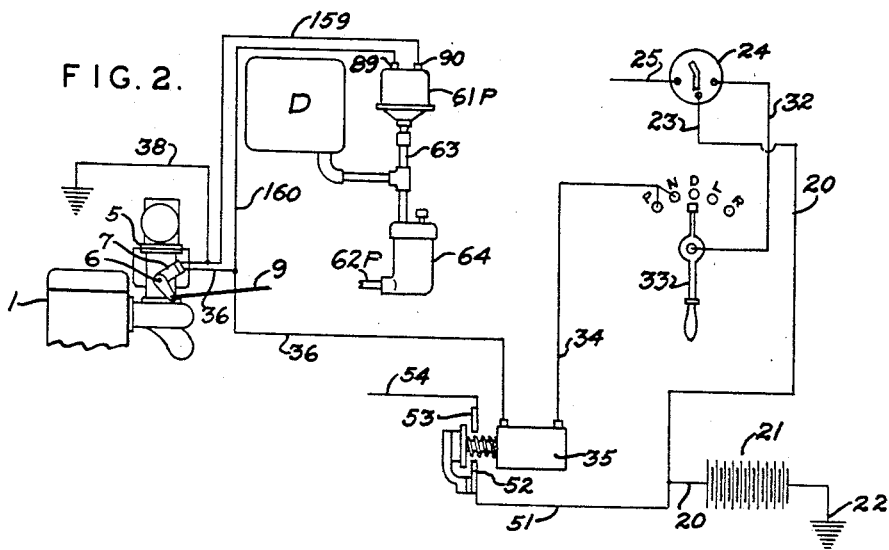
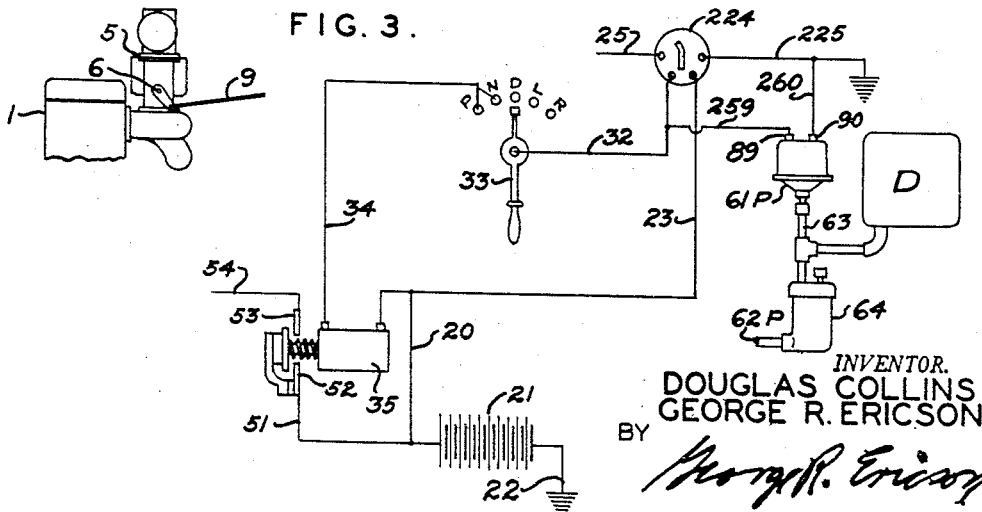

INVENTOR.
DOUGLAS COLLINS
GEORGE R. ERICSON
BY
George R. Ericson
ATTORNEY

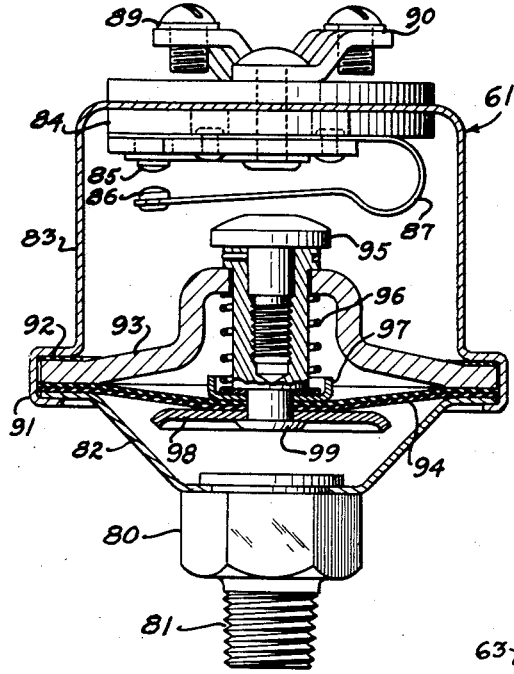
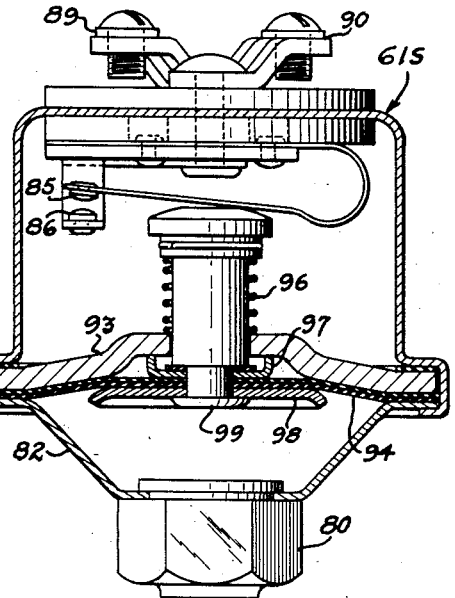
FIG.5.  FIG.10.
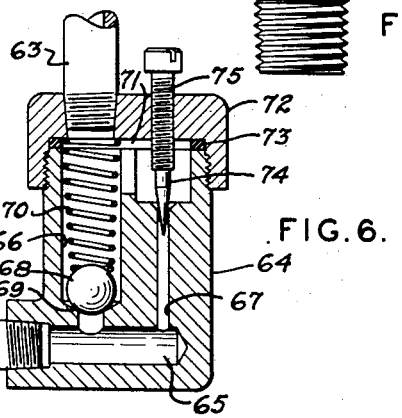
FIG.6.
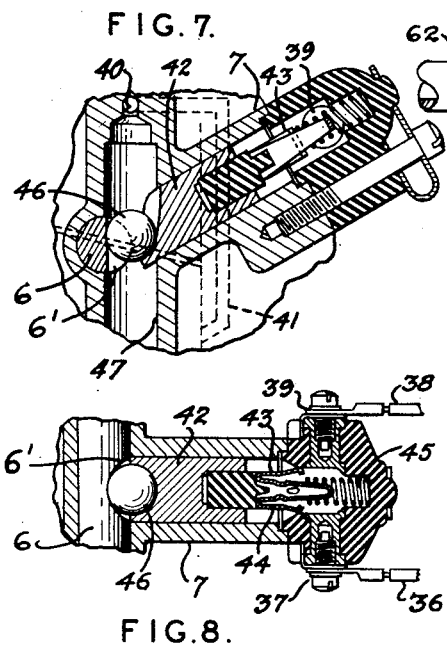
FIG.7.
FIG.8.
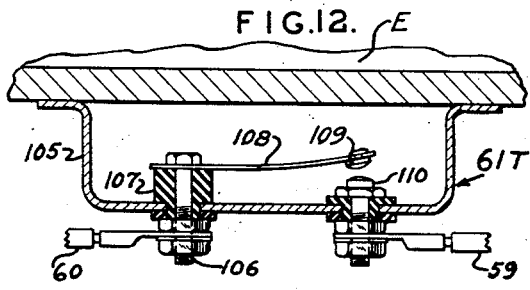
FIG.12.
INVENTOR.
DOUGLAS COLLINS
GEORGE R. ERICSON
BY
*George R. Ericson*
ATTORNEY

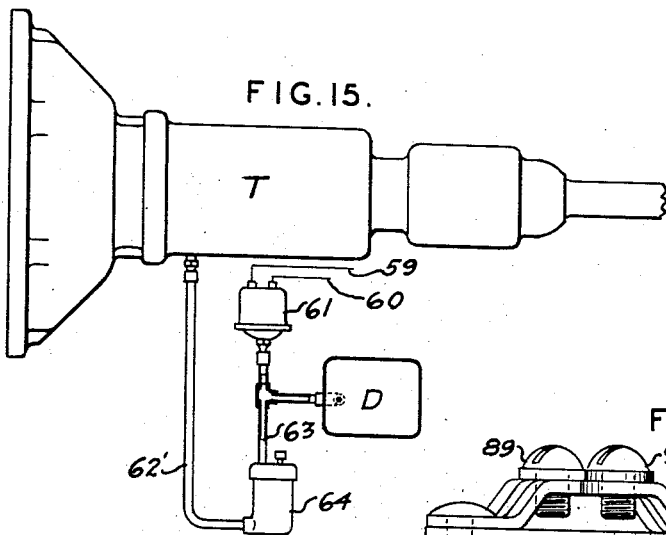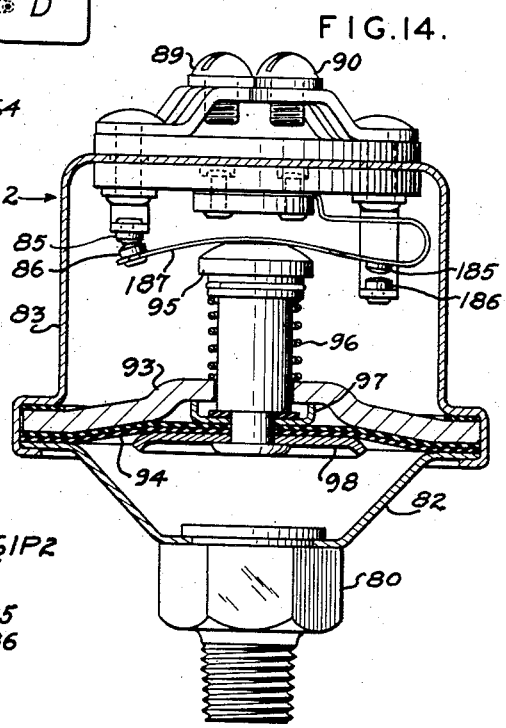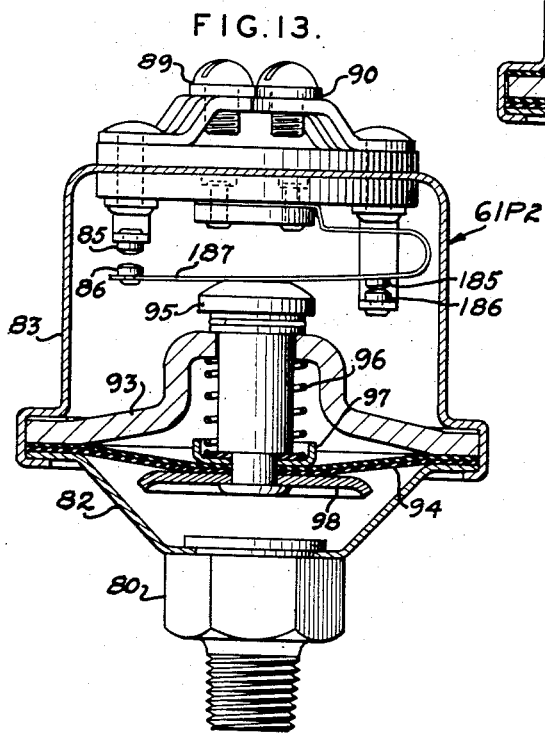

Patented Aug. 3, 1954

2,685,650

UNITED STATES PATENT OFFICE 2,685,650

AUTOMATIC STARTING SYSTEM

Douglas Collins, Salisbury, N. C., and George R. Ericson, Kirkwood, Mo.

Application April 30, 1951, Serial No. 223,778

27 Claims. (Cl. 290—28)

The invention relates to control systems for the electric starters of internal combustion engines in motor vehicles or the like. More specifically it relates to that part of the control system which actuates the relays and the like to control the electric power supply to the starter motor for the engine.

In most of the present models of motor cars, especially those equipped with automatic transmissions it is not possible to restart the engine when it stalls without first moving the transmission control selector lever from a driving position to a neutral or park position. This obvious safety feature is necessary to prevent injury to the vehicle, its occupant or any person or property adjacent the vehicle in case the engine could be started with the control selector lever in a driving position. With the present types of automatic transmissions it is not immediately apparent as in conventional gear transmissions that the transmission is engaged or in gear.

In motor vehicles equipped with sliding gear transmissions or constant mesh gear types, it is rather common to leave the transmission control selector lever in driving position when parked, but, if the operator forgets to release the clutch or shift it to neutral before operating the starter switch the movement of the car usually warns him in time to release the clutch or the starter switch before the engine can start and any serious damage is done. This is because the starter is driving the car forward or backward and battery power is insufficient to turn the engine fast enough to start.

This is not the case with automatic transmissions however, since practically all types incorporate a fluid coupling or torque converter. In the absence of a safety feature such as that now generally used, if the starter were operated with the control lever in a driving position, there obviously would not be the immediate warning movement such as given by direct gear types, nor would a heavy load be imposed on the battery, because of the amount of slip in fluid drives at low speed. For this reason the engine would probably start and the car surge forward or backward depending on the position of the transmission control selector lever.

Probably because this danger was obvious to most motor car manufacturers, the control circuit for the starter was provided with an additional switch operated by the transmission control selector lever in series with the ignition switch and manually operated starter switch, which additional switch is closed only in indicated neutral or park positions of the transmission control selector lever. Although this provides a desirable safety feature it also has some disadvantages.

For example, if the engine should stall while the control selector lever is in a driving position the engine cannot be restarted by closing the manually controlled starter switch until the control lever is shifted to an indicated neutral position. This disadvantage confuses and delays restarting the engine and is decidedly irritating to the operator if traffic is heavy.

Furthermore, it is likewise impossible to move the car by the starter in case of total engine failure. Some means should be provided for this purpose if the engine should fail on a railroad grade crossing. Very few men and certainly no woman would be able to push the car clear, even if perhaps they had the presence of mind to do so.

The above discussed disadvantages apply to all types of transmissions, whether of the standard gear or automatic type when provided with a switch controlling the starter circuit operated by the transmission control selector lever in series relation with a manually operated starter switch which may be hand-operated or of the type shown in prior patent to Collins 2,399,542, or Reissue Patent No. 22,385 to Coffey.

It is the object of this invention to provide an additional circuit and a power responsive control means for that circuit to temporarily shunt the portion of the starter circuit controlled by the switch operated by the transmission control selector lever.

A further object of the invention is to provide a power responsive control means for the additional circuit which has two cycles of operation, in one of which it closes the circuit during engine operation and a second cycle, a predetermined period after power failure, in which it opens the circuit.

A further object of the invention is to provide a control means for the additional circuit which has inherently three cycles of operation each time the engine is started and stopped. One in which it opens the circuit as the engine starts and maintains the circuit open till the engine comes to rest; a second in which it closes the additional circuit to shunt or by-pass the starter switch circuit or that part of the starter control circuit controlled by the switch operated by the transmission control selector lever; and a third in which it opens the additional circuit restoring control to the switches in the starter control circuit.

A further object of the invention is to provide the additional circuit with a means operated in response to engine failure when the lever is in an indicated driving position which will provide a time delay after engine failure to allow the engine to come to a full stop thereby automatically preventing starter operation even though the operator of the vehicle is inadvertently or intentionally premature in operating the manual starter switch and then complete the additional circuit to energize the starter control circuit.

A further object of the invention is to provide the additional circuit with a means operated in response to engine failure, when the control lever is shifted to an indicated driving position, which will close the additional circuit for a predetermined time to provide for emergency restarting of the engine by the manually operated starter switch, and then open the additional circuit and maintain it open to provide the usual safety feature.

A further object of this invention is to provide the starter control system with an additional circuit, either fluid or electric, controlled by a means operated in response to power failure to momentarily, or for a predetermined period, shunt or by-pass the switch operated by the control selector lever for the transmission so that the starter can be operated by the manually controlled starter switch either to restart the engine without shifting the lever to a neutral position or to drive the vehicle by the starter in an emergency or the like.

A further object of the invention is to provide an additional circuit for a starter control system used with automatic transmissions to shunt out that part of the circuit controlled by the manually operated starter switch and a power responsive control means for the additional circuit, which will close that circuit on power failure, so that the starter control system can be operated by moving the transmission control lever from an indicated driving position toward an indicated neutral or park position without operating the manual starter switch.

A further object of the invention is to provide in a motor vehicle a power responsive means to momentarily shunt a portion of a starter control system.

It is a further object of the invention to provide for completely automatic restarting of the engine in case the engine stalls and automatic deenergization of the starter after a predetermined period in case the engine fails to start.

*Brief description*

According to the invention these objects are attained, by providing the usual electric starter system of the type wherein the control circuit includes the ignition switch, the manually operated starter switch, and the switch operated by the gear shift control level of a gear transmission, with an additional circuit to shunt the last mentioned switch. The inclusion of the ignition switch is usual but wholly optional. The additional circuit is controlled by a switch which may be responsive to fluid pressure generated by either the operation of the engine or transmission or by temperature. The additional circuit controlling switch may be of a two cycle or three cycle type. In the case of a two cycle type, the control for the switch is responsive to operation of the engine to close the switch in its first cycle of operation and thereby close the additional circuit and hold it closed during operation and for a predetermined period of time after the engine is stalled. In the second cycle, which follows the first, the switch is operated to open the circuit thereby restoring control of the starter control circuit to the previously mentioned switches. The control mentioned and the switch may be combined as later pointed out or they may be separate but interconnected devices.

In the case of a three cycle type, the control for the switch is responsive to operation of the engine to operate the switch to open the circuit in its first cycle of operation. In the second cycle, following the first, the control for the switch is responsive when the engine stalls to eventually close the switch likewise for a predetermined time. In the third cycle, the switch is operated to open the circuit thereby restoring control of the starter control circuit to the previously mentioned switches in the circuit. The control mentioned and the switch may be combined as later described in detail or they may be separate but interconnected devices.

In case the motor vehicle is equipped with an automatic transmission of the type which includes a direct drive through a fluid coupling or torque converter and a planetary gearing operated by bands or clutches or both powered by a fluid pump under control of a fluid pressure master valve mechanism or gearing mechanically or electrically operated for speed changes, the transmission selector control lever usually operates a switch in the starter system control circuit much as above described. In such cases it is usual to provide for a switch closed position in both neutral and parked positions of the selector control lever. According to the invention the objects are attained, by providing the usual electric starter control system of the type wherein the control circuit includes the ignition switch, the manually operated starter switch, and the switch operated by the selector control lever of the transmission in series relation, with an additional circuit to shunt the last mentioned switch. The inclusion of the ignition switch is usual but wholly optional. The additional circuit is controlled by a switch which may be responsive to power generated by either the operation of the engine or transmission or by their temperature. As above explained the additional circuit controlling switch may be of the two or three cycle type with the inherent advantages of either.

In a motor vehicle equipped with an automatic transmission of the type which includes a fluid coupling, in which only a portion of the total driving torque is transmitted through the fluid coupling, the transmission selector control lever also operates a switch in the starter system control circuit much as in the aforementioned type of automatic and it is usual to provide for a switch closed position in a neutral position of the selector control lever.

Due to the fact above mentioned, that in this transmission type, probably less than half of the driving torque is transmitted through the fluid coupling, and for other reasons not pertinent here, it might be undesirable to actuate the manual starter switch to operate the starter with the transmission selector lever to a driving position, as in the above described system applied to the first type of automatic transmission, for the obvious reason that the amount of slip in the drive is not as great as in the previous type of automatic.

Accordingly the objects of the invention are attained by providing the usual electric starter control system of the type wherein the control circuit includes an ignition switch, a manually operated starter switch, and a switch operated by the selector control lever of the transmission in series relation, with an additional circuit to shunt the manually operated starter switch. The inclusion of the ignition switch in series is usual but wholly optional. The aforementioned additional circuit is controlled by a switch responsive to fluid pressure generated by either the operation of the engine or transmission or by engine temperature. As above explained the additional circuit controlling switch may be of the two or three cycle type with the inherent advantages of either. The invention as applied in the above manner would provide for starter operation by movement of the selector lever to or toward a neutral position.

Accordingly, the objects of the invention including completely automatic restarting of the engine are obtained by merely combining two of the shunt control systems above described and by proper choice of switches for those control systems. For completely automatic restarting the usual electric starter control system of the type above previously described the system is provided with two additional circuits, the first connected to shunt the starter switch and, the second connected to shunt the swich operated by the transmission selector control lever, automatic restarting may be accomplished with the use of the proper switches in the additional circuits. One of the additional circuits is provided with a two cycle switch operated in response to pressure generated by the engine or transmission, or engine temperature, while the other additional circuit is provided preferably with a three cycle switch. In most cases the second switch may also be made responsive to pressure generated by either the engine or transmission.

It is to be emphasized that additional circuits, their control switches, and operators are interchangeable depending on the results desired. Likewise, the application of the additional circuit to shunt the several switches of the starter control system is optional for the same reason.

In the drawings:

Fig. 2 is a diagrammatic illustration of another additional control circuit which can be used with the starter control circuit shown in Fig. 1. A part of the showing in Fig. 1 is included to clarify the application thereto.

Fig. 3 is a diagrammatic illustration of still another possible application of the additional control circuit to the starter control circuit shown in Fig. 1, so much of Fig. 1 is included to explain the application thereto.

Fig. 5 is a cross sectional view of the pressure operated switch usable in Figs. 1-3 showing the contacts.

Fig. 6 is a cross sectional view of the combined check valve and adjustable metering valve of Figs. 1-3 and 9.

Fig. 7 is a vertical section of a throttle valve shaft operated manifold pressure responsive switch in the arrangement shown in Figs. 1 and 2.

Fig. 8 is a horizontal cross sectional view of the switch of Fig. 7.

Fig. 10 is a cross sectional view of a switch suitable for use in the modification of Fig. 9.

Fig. 12 is a cross sectional view of a temperature responsive switch of Fig. 11.

Fig. 13 is a cross sectional view of a second type of pressure operated switch for use in the circuits illustrated in Figs. 1-3, 9, 15 and 16.

Fig. 14 is a cross sectional view of a second type of suction operated switch for use in the circuits illustrated in Figs. 1-3, 9, 15 and 16.

Fig. 15 is a diagrammatic showing of a suction or pressure type switch connected to the output side of the engine driven oil pump of an automatic transmission.

Fig. 16 is a diagrammatic showing of a suction type switch connected to a carburetor throat posterior of the throttle.

Figure 1:
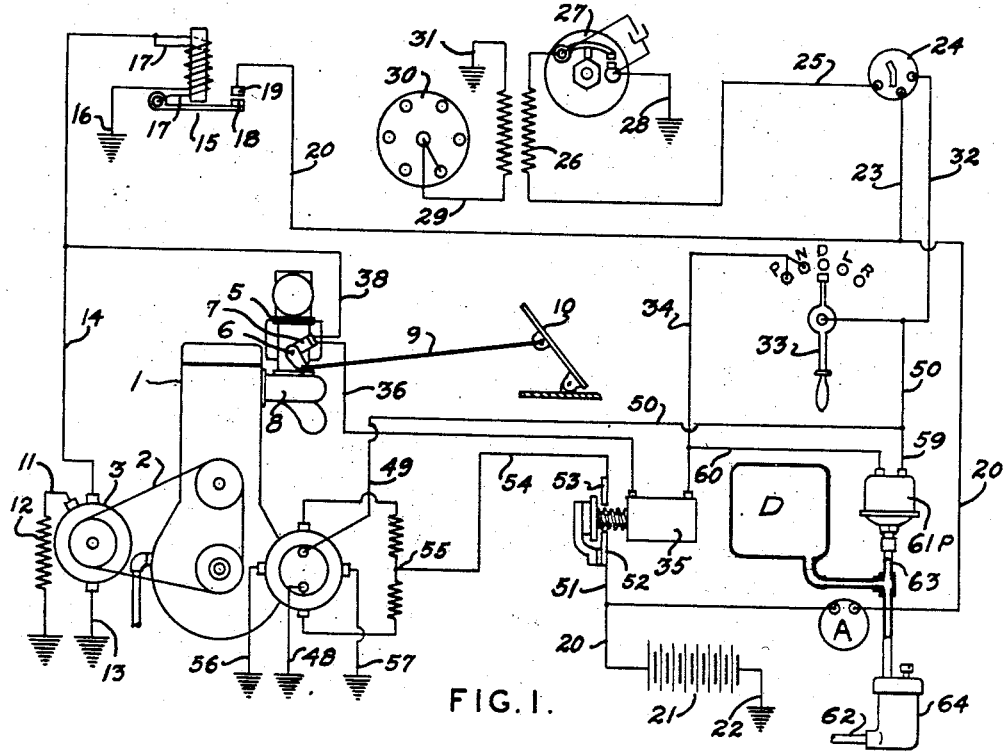
Fig. 1 is a diagrammatic illustration of the parts of the electrical system including engine, generator, starter, ignition switch, and transmission selector lever switch, regarded as a conventional arrangement and also illustrating one of the several additional circuits, which may be used therewith.

The showing in Figure 1 is regarded as a diagrammatic illustration of an additional control circuit as applied to the electrical starter control system of an internal combustion engine. The resulting circuit is adapted for vehicle engine starter control regardless of the type of transmission used, since it will operate satisfactorily with either direct gear or automatic types. It seems to be particularly well adapted to a type in which there is a direct drive through a fluid coupling torque converter or the like.

In the drawings 1 indicates the engine driving a generator 3 through the belt 2. The engine is provided with the usual carburetor 5 on manifold 8 having a throttle valve shaft 6 connected to operate a pressure responsive switch generally indicated at 7 similar to that of Reissue 22,385. A connection 9 is provided between the throttle valve shaft 6 and accelerator pedal 10. The generator 3 is provided with a field connection 11 through a resistance 12 to ground. The armature is provided with two brushes, one of which is grounded at 13 and the other is connected by a lead 14 to the solenoid of a generator cutout 15 and then to ground 16. A shunt circuit 17 connects lead 14 to one terminal of cutout 15. The other terminal 18 connects with contact 19 to close the circuit through lead 20 to battery 21, the other terminal of which is grounded at 22. When the generator is driven cutout 15 is closed and current flows through leads 14 cutout 15 and lead 20 to charge the battery.

The engine ignition circuit is shown connected to the battery by a lead 23 to the primary of a twist switch 24 which is the type actuated by a key completing the circuit through lead 25 through the primary of a coil 26 to the engine operated breaker points generally indicated at 27 to a ground 28. The secondary of coil 26 is connected by a lead 29 to a distributor generally indicated at 30 and to ground 31. This is intended to illustrate a conventional ignition system for the spark plugs and no further explanation appears in order.

The starter system control circuit will now be described in detail: Twist switch 24 simultaneously energizes a part of the starter circuit through lead 32 when operated to energize the ignition. Lead 32 is connected to one terminal of a switch (not shown) connected to a transmission control selector lever 33 which has several possible positions indicated as PNDLR. The switch connects lead 32 to lead 34 when lever 33 is positioned in the P&N positions only. The other end of lead 34 is connected to a starter solenoid 35. The other terminal of solenoid 35 is connected by lead 36 to one terminal 37 of pressure responsive switch 7 which has a lead 38 from the opposite terminal 39 connected to lead 14 and so to ground 13 when cutout 15 is open.

The switch 7 has a vertically arranged bore 47 provided with an orifice 40 which connects bypassage 41 with the carburetor, posterior of the throttle valve. The throttle shaft 6 is journalled in bearings to intersect the bore 47 so that an arcuate notch 61 coincides with the walls of the bore 47. Opposite the notch is plunger 42, mounted in a diagonally related bore, and carrying switch elements 43 and 44 biased toward the bore by a spring 45 biased between the plunger and the switch cap. Between the plunger 42 and the throttle shaft is a free ball 46 forming a mechanical connection to actuate the plunger 42 and close the switch 43 and 44 upon operation of the accelerator pedal 10. When the engine starts suction through passage 41 raises the ball so that no mechanical connection exists between the throttle shaft and the switch.

The starter motor circuit is of the type which has one brush grounded by lead 48 and the other connected to the battery by leads 49, 50 and 32, through twist switch 24 to leads 23 to 20 connected to the battery terminal. The other circuit for the starter motor field includes lead 51 connected to lead 20, through starter solenoid 35 having terminals 52 and 53 to lead 54 which connects at 55 to a split field circuit of the starter motor. Each field is connected to ground through leads 56 and 57 respectively.

The starter circuits so far described are similar to those shown in the Coffey Reissue 22,385.

As further shown in Fig. 1 two leads 59 and 60 are connected to leads 32 and 34 to by-pass, or shunt, the switch operated by the transmission control selector lever 33. This shunt circuit is controlled in turn by a pressure operated switch 61P of any one of the forms illustrated and later described in detail, to the terminals of which, leads 59 and 60 are connected.

In the present modification switch 61P communicates directly with the oil pump of the engine 1 by an oil pipe connection 63, 62 which connects the switch directly to the engine oil pump. Between oil lines 62 and 63 is interposed a combined check valve with an adjustable metering orifice, and an air dome D.

Referring to Fig. 6 which illustrates the combined check valve and metering device it will be noted that oil line 62 connects with a chamber 65 in one end of the body and that extending transversely thereto and communicating therewith are two passages 66 and 67. In the first passage is ball valve 68 pressed upon a seat 69 by a spring 70 interposed between the ball and a cap 72 screw threaded onto body 64 and spaced slightly therefrom by a thick gasket 73 to form a second chamber 71.

In the second passage 67 is a needle valve 74 which in turn is adjustably mounted to vary the flow through passage 67 by means of screw threads 75 cooperating with corresponding threads in cap 72. Both passages 66 and 67 communicate with chamber 71 which in turn is directly connected to oil line 63.

From this description so far it can be readily understood that oil pressure from the oil pump will enter chamber 65 through oil line 62. Spring 70 is so selected as to permit ball valve 68 to unseat before full engine oil pump operating pressure is reached and oil will fill the entire body 64 and escape through line 63 where it will compress the air in the dome D and, if present, that in switch body 61P.

On the other hand when oil pump pressure fails, valve 68 will seat trapping the oil in body 64 and line 63. Oil pressure will be relieved gradually in line 63 and likewise on switch 61P as the oil leaks past needle valve 74 through passage 67 to chamber 65 and supply line 62. The rate of pressure relief may be readily controlled by needle valve adjustment while the time required to relieve the pressure on switch 61P can be controlled by selection of air dome D. In other words, the more rapid the desired response, the smaller the size of the air dome for any given rate of flow past the needle valve. Conversely, the larger the dome, the slower the response for any given rate past the needle valve.

Figure 9:
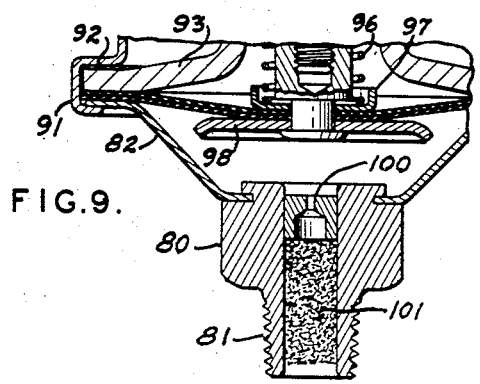
Fig. 9 is a cross sectional view of a portion of a pressure operated switch mechanism usable in Figs. 1-3 showing the metering nozzle in detail.

Figs. 5 and 9 illustrate one preferred form for a pressure switch generally indicated at 61P in Fig. 1. The switch comprises a nipple provided with threads 81 for connection to an oil line 63 or the like and a two part outer casing with a lower part 82 sealed to nipple 80 and an upper part 83 of inverted cup shape carrying inside its upper wall a switch base member 84. On this base is a fixed contact 85 and a U-shaped spring 87 carrying a second contact 86 opposed to contact 85. Both are attached to the casing by rivets passing through the casing, the base plate and a cover plate of insulating material. Contacts 85 and 86 are connected to terminals 89 and 90 respectively to which are connected leads 59 and 60 of Fig. 1.

The upper part of the casing 83 is provided with a reentrant flange portion 91 which supports in superposed relation an upper sealing gasket 92, the peripheral flange portion of a bridge member 93, a flexible diaphragm 94, and a lower housing member 82 respectively. The bridge member 93 is centrally apertured to receive a headed plunger 95 of insulating material which has a metal shank portion slidable in the aperture and urged to a downward position by a spring 96 with its upper end resting against the underside of the bridge 93 and its lower end resting on the upper one 97 of a pair of washers 97 and 98 between which the diaphragm 94 is secured by a rivet 99 at the opposite end of the headed plunger 95.

As shown in Fig. 9 the oil line connection nipple 80 is provided with an orifice 100 to control the rate of flow of fluid in or out of the switch body. It also contains a filter element 101.

It is readily apparent that fluid under pressure, entering through filter 101 and orifice 100 will act, on the diaphragm 94 to raise the plunger 95 upward against the spring 96 until headed plunger 95 raises spring arm 87 to close contacts 85 and 86 thereby completing an electric circuit from terminal 90 to 89.

A complete system has now been described, the function of which forms an operative circuit which will carry out the objects of the invention as described above.

In a first condition where the engine is initially at rest switch 61P is open. Therefore, closing of ignition switch 24 and operation of pedal 10 to close switch 7 will not start the engine if transmission control selector lever 33 is in any of several selected driving positions, one of which is illustrated in Fig. 1, and clearly the safety features of the starter circuit are preserved. On the other hand the circuit is completed when lever 33 is in positions P or N and the starter will respond to operation of foot pedal 10.

If the engine has been started and has built up oil pressure to close contacts 85 and 86 of switch 61P, then that portion of the starter control circuit which includes the switch operated by the transmission control selector lever is shunted by connection of lead 32 with lead 34 through leads 58, 59 and 60 and switch 61P which remains closed for a predetermined time even after oil pressure fails at the engine oil pump due to the action of the metering devices 74 and 100, and air dome D.

Now, if the engine should stall with switch 24 on, it can be restarted immediately, after suction releases ball 46 so that switch 7 is enabled, by merely pressing pedal 10 regardless of the position of transmission control selector lever 33.

In the drawings Fig. 2 illustrates another application of the additional control circuit to the electrical starter system for an internal combustion engine described above and diagrammatically illustrated in Fig. 1. The resulting circuit is adapted for vehicle engine starter control regardless of the type of transmission used since it will operate satisfactorily with either direct gear or automatic types.

It seems to be particularly well adapted however to the type of automatic transmission in which only a portion of the driving torque is transmitted directly by the fluid coupling or torque converter.

Referring to the drawings Fig. 2 shows only so much of the wiring diagram of Fig. 1 as is necessary for an understanding of the application of the additional circuit and switch to the starter control circuit. To further facilitate the showing in Fig. 2 the same reference characters are applied to corresponding parts.

Since the electrical starter control circuit is identical with Fig. 1 only the connection of the additional control circuit will be described. The carburetor mounts a pressure responsive switch 7 which is actuated mechanically by accelerator pedal 10 through rod 9 and throttle valve shaft 6. The mechanical connection is disabled in response to manifold pressure when the engine is operating. Instead of being connected to shunt control lever 33 from the circuit, switch 61P is relocated to shunt out the starter switch 7. The change in connections to switch 61P to produce this function are described hereinafter. From switch 7 extend two leads 36 and 38 connected to the battery and to ground respectively. Connected to lead 38 is a lead 159 extending to terminal 99 of pressure operated switch 61P. The other terminal thereof 89 is connected by a lead 160 to the other lead 36 from switch 7 to form the shunt circuit for starter switch 7.

Pressure switch 61P is of the type shown in Figs. 5 or 13 and is connected to a source of pressure either from the engine or from the transmission by line 62P, combined check valve and metering device 64, and line 63. A pressure dome D is provided in line 63 for the same purpose as that described above in reference to Fig. 1.

A complete system has been described, the function of which forms an operative circuit which will carry out the objects of the invention as described above, for example:

In a first condition with the engine initially at rest, switch 61P is open. Therefore, closing of ignition switch 24 and operation of pedal 10 to close switch 7 will not start the engine if transmission control selector lever 33 is in any of several selected driving positions, one of which is illustrated, and clearly the safety features of the starter circuit are preserved. On the other hand, the circuit is completed when lever 33 is in selected neutral positions P or N and the starter will respond to operation of foot pedal 10.

If the engine has been started and has built up pressure in switch 61P, the contacts 85 and 86 (not shown) will be closed and the portion of the circuit including starter switch 7 is shunted through lead 160, to lead 36 connected to the battery, through switch 61P to lead 159 and lead 38. It will be understood that when cutout 15 is open lead 38 will connect with ground.

Now if the engine should stall, switch 61P will remain closed or will subsequently close for a predetermined time even though the pressure in line 62P drops due to the metering devices and air dome controlling pressure in line 63. This being the case then starter switch 7 remains shunted from the control circuit. Therefore, if ignition switch 24 remains on and lever 33 is in one of the positions DL or R, the engine starter circuit can be energized by merely moving the lever 33 to or toward the N or P positions.

On the other hand if the engine stalls with the switch 24 on and lever 33 in either the P or N positions then the starter circuit will be automatically energized to restart the engine.

As pressure drops in line 63 the switch 61P will eventually reopen and deenergize the circuit and restore control thereof to switch 7.

In the drawings Fig. 3 illustrates another application of the additional control circuit to the electrical system of an internal combustion engine described above and diagrammatically illustrated in Fig. 1. The resulting circuit is applicable to vehicle starter control regardless of the type of transmission but it seems to be particularly well adapted however to either a direct gear type with a manual operator, whether used with a fluid coupling or not, or to the automatic type in which only a portion of the driving torque is transmitted directly by the fluid coupling, torque converter or the like device.

Referring to the drawings, Fig. 3 shows only so much of the wiring diagram of Fig. 1 as is necessary for an understanding of the application of the additional circuit and switch to the starter control circuit. To further facilitate the showing in Fig. 3, the same reference characters are applied to corresponding parts.

Since the electrical starter control circuit is identical in most respects with Fig. 1 only the connection of the additional control circuit will be described together with any parts added.

In Fig. 3 the switch 7 and its circuit are omitted, instead a combined starter and ignition switch 224 has been substituted. This switch is of a type well known in the art, a twist actuated type, to first energize the ignition and part of the starter circuit and then on further turning against a torque spring energize the starter circuit. On release the switch returns to ignition on position. For this reason it requires an extra lead from switch 224 indicated at 225 leading to ground otherwise the connections to switch 224 are identical with switch 24 of Fig. 1.

As in the structure in Fig. 2 a circuit is provided to shunt the starter switch instead of for shunting out the control lever actuated switch. All this requires is a relocation of switch 61P or switch 61P2, described hereinafter. In this case the circuit comprises a lead 260 connecting terminal 90 of switch 61P with lead 225, and lead 259 connecting terminal 89 with lead 32.

Pressure switch 61P is of the type shown in Figs. 5 or 13 and is connected to a source of pressure either from the engine or from the transmission by a line 62P, combined check valve and metering device 64 and line 63. A pressure dome D is provided in line 63 for the same purpose as that described above in reference to Fig. 1.

A complete system has been described, the function of which will carry out the objects of the invention as described above, for example:

In a first condition with the engine initially at rest, switch 61P is open, therefore, closing the starter and ignition switch 224 by twisting to its limit will not operate the starter if transmission control selector lever 33 is in any of the several selected driving positions, one of which is illustrated, because the circuit between leads 32 and 34 is open. Clearly the safety features of the starter circuit are preserved intact. On the other hand, the circuit is completed when lever 33 is in selected neutral positions P or N and the starter will respond to full operation of twist switch 224.

If the engine has been started and has built up pressure in switch 61P, the contacts 85 and 86 (not shown) will be closed and the portion of the circuit including starter switch 224 is shunted by connection through lead 260 to lead 225 through switch 61P to lead 259 and lead 32.

Now if the engine should stall, switch 61P will remain closed for a predetermined time even though pressure in line 62P drops due to the metering devices and air dome controlling the pressure in line 63. This being the case, then the portion of the starter circuit through switch 224 remains shunted from the remaining control circuit. Therefore, if the ignition circuit through switch 224 remains on, and lever 33 is simultaneously in one of the positions DL or R, the engine starter circuit can be energized by merely moving the lever 33 to or toward the N or P positions and the engine restarted.

On the other hand if the engine stalls with the ignition circuit through switch 224 on, and lever 33 in either positions P or N, then the starter circuit will be automatically energized to restart the engine.

As pressure drops in line 63 the switch 61P will reopen after a predetermined time interval and deenergize the circuit and restore control thereof to switch 224.

Figure 4A:
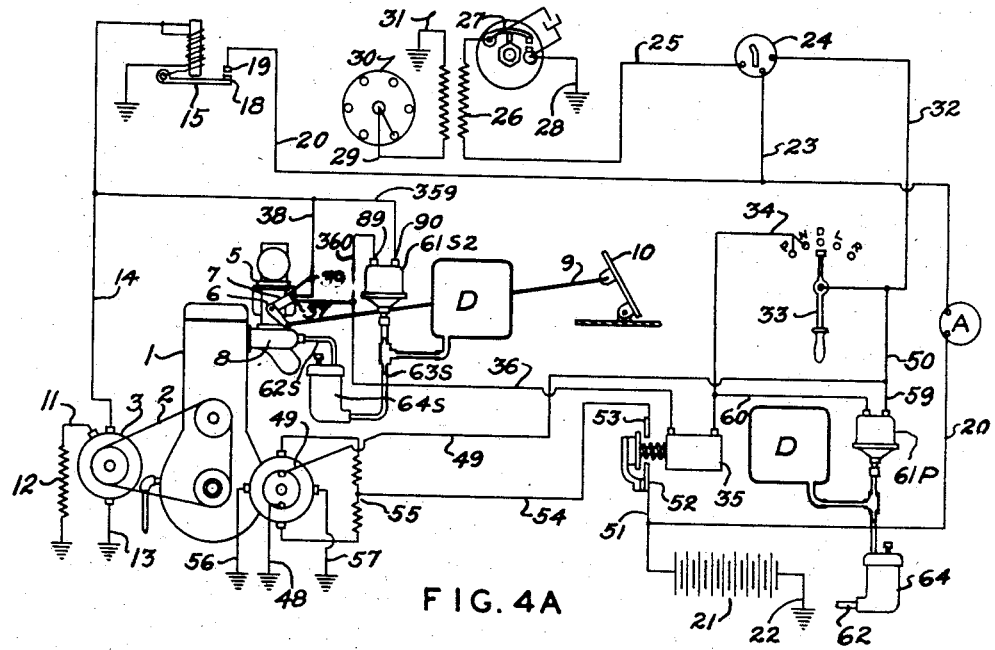
Fig. 4A is a diagrammatic illustration of a starter system using two automatic switches which will give temporary automatic restarting.

In the drawings Fig. 4A illustrates another application of an additional control to the electrical starter system for an internal combustion engine described above and diagrammatically illustrated in Fig. 1. When this circuit and its control means are applied to the starter control circuit of Fig. 1 it will provide an automatic restart. Such a system appears to be satisfactory for a vehicle with an automatic transmission of the type in which all the engine torque is transmitted directly by the fluid coupling, torque converter or the like.

Referring to the drawings, Fig. 4A shows only so much of the wiring diagram of Fig. 1 as is necessary for an understanding of the application of the additional circuit and switch to the starter control circuit. To further facilitate the showing in Fig. 4A the same reference characters are applied to corresponding parts.

Since the electrical starter control circuit is identical with Fig. 1 only the connections necessary for the addition of the control circuit of Fig. 4A will be described.

Referring to Fig. 4A a suction operated switch is used which is of the two pole type shown in Fig. 14 to be described later. To distinguish it from the other types of pressure and suction operated switches it is indicated by reference character 61S2. The terminals 89 and 90 of switch 61S2 are connected by leads 359 and 360 to leads 38 and 36 both respectively. Operation of the switch is by a connection 62S with intake manifold 8 of the engine. A combined check valve and metering device 64S is connected to line 62S and 63S which leads to the switch. It will be noted on inspection of the drawings that 64S is in the reverse position from that shown at 64 in Fig. 1. This is because in a suction device flow is opposite to that in a pressure type. An air dome D is connected to line 63S for the same purpose as that described for the pressure type of switch.

Fig. 14 illustrates a preferred form of suction switch of a three cycle type such as generally indicated at 61S2. The body of the switch is constructed in a like manner to that of Fig. 5 already described in detail. Internally the switch mechanism differs in two material respects. Where the parts are identical however, the same reference characters have been applied. The plunger 95 is biased in a fully raised position as shown by a spring 96. In this position it deforms the spring member 187 slightly and coacting contacts 85 and 86 one of which is on one end of the spring member 187 are held engaged but the deformation of the spring member separates two other coacting contacts 185 and 186 mounted respectively on the spring member and on the casing. The switch is so constructed that the circuit is not completed from terminal 89 to 90 unless both sets of contacts are closed. As shown therefore, the circuit is open but if suction is applied to lower plunger 95 against spring 96, spring member 187 will straighten out gradually and contacts 185 and 186 will close and remain closed as the plunger descends. When this happens the circuit is also closed and will remain so until the plunger approaches its extreme lower position at which point the contacts 85 and 86 will separate thereby opening the circuit. When suction is relieved the plunger will move upwardly and as it moves close contacts 85 and 86 thereby closing the circuit and then separate contacts 185 and 186 again opening the circuit.

The travel of the plunger therefore produces three cycles of operation in each complete movement up or down and the circuit will be open when the switch is subject to suction from the intake manifold and also will be open a predetermined time after the suction is completely relieved, but during its travel it does close the circuit.

It will be understood that when the structure in Fig. 4A is connected into the control circuit of Fig. 1, two automatic switches 61P and 61S2, both actuated in response to conditions indicative of power supply or power failure, are provided in the system. This complete system will carry out one of the objects of the invention, that is, to provide automatic restarting of a stalled engine.

In a first condition where the engine is initially at rest, both switches 61P and 61S2 will be open. Therefore, closing the ignition switch and then the starter switch 7 will not operate the starter unless control selector lever 33 is in one of the positions P or N so that leads 32 and 34 are connected. Clearly, then, safety features of the starter circuit are preserved intact.

In a second condition where the engine has been started, pressure in line 62 will close switch 61P, and suction will first close and then open switch 61S2, but since the response of the latter will be more rapid than that of the former, the two switches will not be closed at the same time, therefore, after starting and during running of the engine, switch 61S2 will be open when switch 61P is closed. Under this condition the starter circuit will be open.

In a third condition, where the engine stalls, pressure in line 62 will drop, but switch 61P is in its first cycle and will remain closed due to the action of the metering device 64 and air dome D. During this same period, switch 61S2 is in its first open cycle and is adjusted so that failure of suction effect will likewise be delayed to predetermine the time of the first cycle. This adjustment is so made that there will be a time delay long enough for the engine to come to rest, then switch 61S2 moves to its second or closed cycle. Since switch 61P is adjusted to be simultaneously in its first or closed cycle, the starter circuit will be closed regardless of the position of the transmission control selector lever. The starter will be energized and the engine automatically restarted with or without operation of the starter switch or the transmission control lever by the operator. Of course, if the ignition is turned off, the starter circuit is opened and the automatic disabled.

If the engine fails to start, however, either switch 61P will open in its second cycle, or switch 61S2 will open in its third cycle, so as to open the starter motor circuit.

Figure 4:
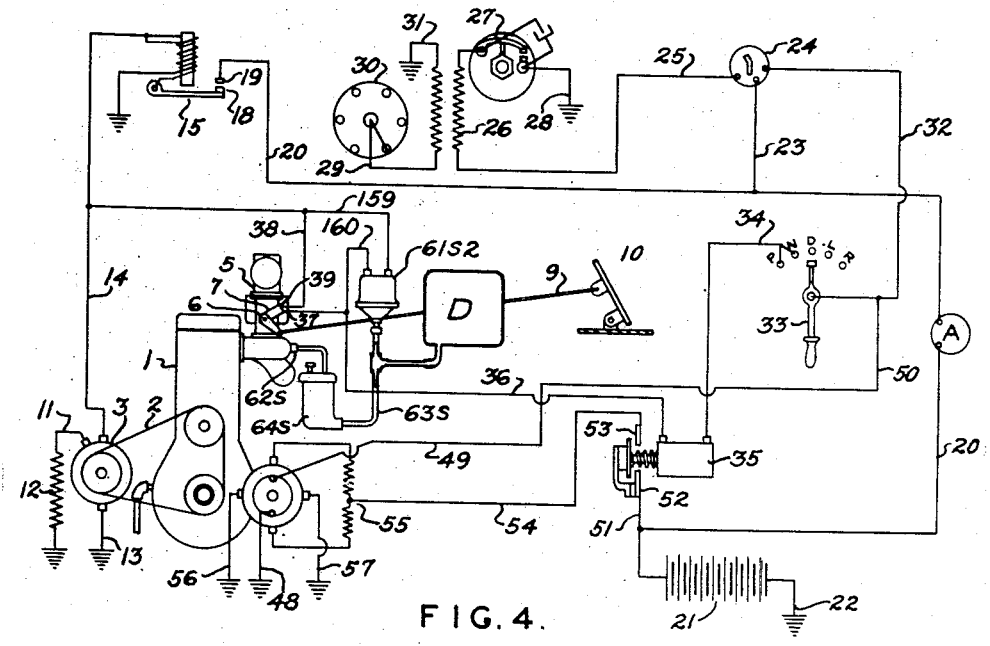
Fig. 4 is a diagrammatic illustration of a modification using a vacuum operated switch.

Fig. 4 shows another modification of the invention very similar to that shown in Fig. 2 and, for this reason, the same reference characters have been used to identify like parts. In this figure, instead of a pressure type of switch such as illustrated at 61P in Fig. 2, a suction operated switch is employed such as 61S2 illustrated in Fig. 14. This switch is connected to the manifold by way of lines 63S and 62S through metering valve 64S of the type described above in the description of Fig. 4A.

The operation of the embodiment shown in Fig. 4 is the same as that described for Fig. 2 except for the fact that the switch 61S2 is of the three-cycle type and will operate in response to suction as described in the preceding paragraph.

Referring to Fig. 10, a suction operated switch 61S is shown similar to the pressure switch 61P. The switch differs, however, in that spring 96 is on the upper side of bridge 93 and the contacts 85, 86 are reversed in position so that suction on diaphragm 94 compresses spring 96 to close the contacts 85 and 86 and complete the circuit from terminal 89 to 90.

It is pointed out that switches 61P and 61S are interchangeable in the systems disclosed, and the choice of one or the other is a matter of preference depending upon whether the selected source to indicate power supply is pressure or suction.

Figure 11:
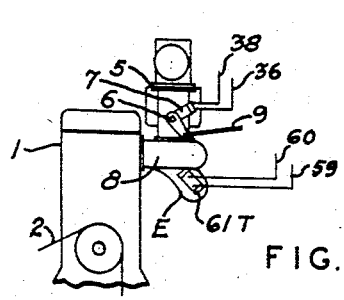
Fig. 11 is a diagrammatic view of still another switch responsive to temperature adapted for use in the embodiment of Figs. 1-3.

Referring to Figs. 11 and 12, still another modification which will operate in the control system shown in Figure 1 is illustrated. For that reason, like numerals and reference characters have been employed so that the application of this modification to Figure 1 amounts to a mere substitution of like parts having the same reference characters. As in Figure 1, the engine is indicated by reference character 1 and is provided with the carburetor 5 having throttle switch 6 operating a switch 7 identical with those of Figure 1. Likewise, the leads from switch 7 are indicated by reference characters 36 and 38 and are connected in the same manner as in Figure 1.

In Fig. 11, the exhaust manifold for the engine is indicated as E and on the exhaust manifold is mounted temperature responsive switch 61T which completes the circuit between two leads 59 and 60 which are connected in the circuit of Figure 1 in the same manner as those indicated by the same reference characters.

Referring to Fig. 12, the details of construction of switch 61T are shown together with the position of the manifold E to which the switch 61T is secured. The switch comprises a housing 105, and mounted in the housing is a lead terminal 106 surrounded by an insulating block 107. Interiorly of the housing 105 and mounted on the terminal 106 is a bimetallic, thermally responsive switch arm 108 carrying a contact 109 remote from the terminal. In alignment with this contact 109 is a second contact 110 secured in an insulating block 111, also mounted in the housing 105. Both terminals are secured in a suitable fashion, such as by a threaded nut, or the like.

A complete system has been described, which when substituted for like parts in Figure 1, will form an operative circuit which will carry out the objects of the invention as described above. In the first condition where the engine is initially at rest, the switch 61T is open due to the fact that it is not subjected to the heat from the exhaust of the engine. Accordingly, closing the ignition switch 24 and operation of the pedal 10 to close the switch 7 will not start the engine if the transmission control selector lever 33 is in any of the driving positions, as is illustrated in Figure 1, and clearly, the safety features of a starter circuit, which includes a switch operated by the transmission control selector lever in the manner described, are preserved. On the other hand, if the engine has been started, exhaust temperature will close contacts 109 and 110. Accordingly, that position of the starter control circuit, which includes the switch operated by the transmission control selector lever, is shunted by connection of the lead 32 with lead 34 through leads 58, 59 and 60 and switch 61T which is so designed as to remain closed for a predetermined time, even after the engine has ceased functioning. Now, if the engine should stall, it can be restarted immediately after suction releases the ball 46 so that switch 7 is again enabled to be closed, by merely pressing pedal 10, regardless of the position of the transmission control selector lever 33.

Referring to Fig. 13, a pressure operated switch of the double contact type 61P2 is shown, similar in construction to the switch 61S2.

The pressure switch of Fig. 13 differs, however, in that spring 96 is on the lower side of bridge 93 so that pressure acting on the diaphragm 94 compresses spring 96 to close the contacts 85, 86 and complete the circuit from terminal 89 to 90 and then open the contacts 185, 186 to open the circuit between the terminals. Switch 61P2 is also a three cycle switch, as will be noted from the drawings, as described. In the first cycle, the switch is open; in the second, it is closed; and in the third, it moves to open the circuit.

It is pointed out that the switches 61P2 and 61S2 are interchangeable in the systems disclosed and the choice of one or the other is a matter of preference, depending upon whether the selected source to indicate power supply is pressure or suction.

Referring to Fig. 15, an application of a switch is shown to the fluid pump of a transmission T. It will be readily recognized that since such a pump derives its power from the engine, it is also a power source indicative of engine operation. Since the location of such a pump varies, depending on the type of transmission, the showing is wholly diagrammatic. Oil line 62', which corresponds with line 62 in the previous figures, is connected to either the suction or pressure side of a pump (not shown) which forms the power source to operate the transmission or to lubricate the same, or for both purposes. Line 62' is, in turn, connected to a unit 64, which, if connected to a pressure source, will be arranged as shown. Unit 64 connects by line 63 with an air dome D and with a switch 61 which may be any one of the four types above described. The switch 61 is in turn connected into the circuit by the usual leads 59 and 60 which correspond to and are the same as shown in the circuit diagrams.

Referring to Fig. 16, a portion of a carburetor 5 is shown. This view shows a switch 61 which can be any one of the suction actuated types described, applied directly to the throttle body. A threaded boss 172 is provided, to which nipple 80, containing a metering nozzle as in Fig. 9, is attached, and a passage 162 communicates between the threaded opening and the carburetor throat posterior to the throttle valve mounted on throttle shaft 6.

The switch 61 has the usual terminals 89 and 90 which may be connected in the circuits above described in the same manner as in Figs. 1-4, inclusive.

The circuits described above are merely illustrative of the invention and are not intended in a limiting sense, and as has been pointed out, the various connections of the switches into the circuits may be in any manner falling within the scope of the invention as defined by the appended claims.

We claim:

1. A motor vehicle having a transmission and including a power source for operating the transmission, a starter motor, a starter motor control circuit, a control lever movable to and from indicated driving and neutral positions to control transmission action, a first means operated by said control lever for opening or closing said circuit when in selected positions, a second means for opening or closing said circuit in series relation with said first means, the combination therewith of automatic means connected to said control circuit in shunt relation to said first means responsive to a condition indicative of power failure of said power source to temporarily shunt said first and second means consecutively, but during a portion of the same time interval.

2. A motor vehicle having a transmission and including a power source for operating the transmission, a starter motor, a starter motor control circuit, a control lever movable to and from indicated driving and neutral positions to control transmission action, a first means operated by said control lever for opening or closing said circuit when in selected positions, a second means for opening or closing said circuit in series relation with said first means, the combination therewith of automatic means connected to said control circuit in shunt relation to said first means responsive a predetermined time subsequent to a condition indicative of power failure of said power source to temporarily shunt one or both said first and second means.

3. A motor vehicle having a transmission and including a power source for operating the transmission, a starter motor, a starter motor control circuit, a control lever movable to and from indicated driving and neutral positions to control transmission action, a first means operated by said control lever for opening or closing said circuit when in selected positions, a second means for opening or closing said circuit in series relation with said first means, the combination therewith of automatic means connected to said control circuit in shunt relation to said first means responsive a predetermined time subsequent to a condition indicative of power failure of said power source to temporarily shunt said first and second means consecutively and during a portion of the same time interval.

4. A motor vehicle having a transmission and including a power source for operating the transmission, a starter motor, a starter motor control circuit, a control lever movable to and from indicated driving and neutral positions to control transmission action, a first means operated by said control lever for opening or closing said circuit when in selected positions, a second means for opening or closing said circuit in series relation with said first means, the combinaation therewith of automatic means connected to said control circuit in shunt relation to said first means responsive a predetermined time subsequent to a condition indicative of power failure of said power source to temporarily shunt one or both said first and second means at a predetermined time.

5. A motor vehicle having a transmission and including a power source for operating the transmission, a starter motor, a starter motor control circuit, a control lever movable to and from indicated driving and neutral positions to control transmission action, a first means operated by said control lever for opening or closing said circuit when in selected positions, a second means for opening or closing said circuit in series relation with said first means, the combination therewith of automatic means connected to said control circuit in shunt relation to said first means responsive to a condition indicative of power failure of said power source to temporarily shunt said first and second means consecutively and during a portion of the same time interval and thereafter restore control of the circuit to said means.

6. In a motor vehicle, an engine and a manually controlled starting system for said engine including, a starter motor, a starter motor control circuit and manually operated means in said control circuit for opening and closing said control circuit to operate said starter motor, the combination therewith of a system temporarily active to restart the engine when it stalls, comprising automatic means connected to said manually operated means and said engine, and operated responsive to a condition indicative of operation of said engine to actuate said automatic means to an active position whereby said control circuit is maintained open and to respond subsequent to another condition indicative of engine stalling to shunt said manually operable means whereby said control circuit is automatically closed to restart said engine.

7. In a motor vehicle, an engine and a manually controlled starting system for said engine, including a starter motor, a starter motor control circuit and manually operated means in said control circuit for opening and closing said control circuit to operate said starter motor, the combination therewith of a system temporarily active to restart the engine when it stalls, comprising automatic means connected to said manually operated means and to said engine, and operated responsive to a condition indicative of operation of said engine to energize said control circuit whereby said starting system is conditioned to restart said engine when said engine stalls, and timer means for maintaining said automatic means active for a limited period after said engine stops and then for restoring control of said starting system to said manually operated means.

8. In a motor vehicle, an engine and a manually controlled starting system for said engine including a starter motor, a starter motor control circuit and manually operated means in said control circuit for opening and closing said control circuit to operate said starter motor, the combination therewith of a system temporarily active to restart the engine when it stalls, comprising automatic means connected to said manually operated means and said engine, and operated subsequent to a condition indicative of engine stalling to shunt said manually operated means, whereby the circuit is automatically closed to restart said engine, and timer means for said automatic means for maintaining said automatic means active for a limited period after engine stalling and then for restoring control to said manually operated means.

9. In a motor vehicle, an engine and a manually controlled starting system for said engine including a starter motor, a starter motor control circuit and a plurality of manually operated means in said control circuit for opening and closing said control circuit to operate said starter motor, the combination therewith of a system temporarily active to restart the engine when it stalls, comprising automatic means connected to some of said manually operated means and to said engine and operated subsequent to a condition indicative of engine stalling to shunt all but one of said manually operated means whereby said control circuit can be controlled by manual operation of a single means to restart said engine.

10. In a motor vehicle, an engine and a manually controlled starting system for said engine including a starter motor, a starter motor control circuit and manually operated means in said control circuit for opening and closing said control circuit to operate said starter motor, the combination therewith of a system temporarily active to restart the engine when it stalls, comprising automatic means connected with said manually operated means and to said engine, and operated subsequent to a condition indicative of engine stalling, first, to shunt said manually operated means for a predetermined period whereby the said control circuit is automatically closed to restart said engine, and, secondly, to open said control circuit and restore control to said manually operated means.

11. In a motor vehicle, an engine and a manually controlled starting system for said engine including a starter motor, a starter motor control circuit and a plurality of manually operated means in said control circuit for opening and closing said control circuit to operate said starter motor, the combination therewith of a system temporarily active to restart the engine when it stalls, comprising automatic means connected with all but one of said manually operated means and to said engine and operated subsequent to the occurrence of a condition indicative of engine stalling, first, to shunt all but one of said manually operated means whereby the circuit can be controlled by manual operation of a single means to restart the engine, and, secondly, to open said control circuit and restore control to all said manually operated means.

12. In a motor vehicle, an engine and a manually controlled starter system for said engine including a starter motor, a starter motor control circuit, manually operated means in said control circuit for opening and closing said control circuit to operate said starter motor, and a starter switch in said circuit, the combination therewith of a system temporarily active to restart the engine when it stalls, comprising automatic means connected to said manually operated means and to said engine, and responsive subsequent to the occurrence of a condition indicative of engine stalling to shunt said manually operated means whereby said control circuit is closed to restart the engine by operation of said starter switch.

13. In a motor vehicle, an engine and a manually controlled starting system for said engine including a starter motor, a starter motor control circuit, and manually operated means in said control circuit for opening and closing said control circuit including a starter switch and a safety switch, the combination therewith of a system temporarily active to restart the engine when it stalls, comprising automatic means connected to said starter switch and said engine and responsive subsequent to a condition indicative of engine stalling to shunt said starter switch whereby said control circuit is closed by actuation of said safety switch to restart said engine.

14. In a motor vehicle, an engine and a manually controlled starting system for said engine including a starter motor, a starter motor control circuit and manually operated means in said control circuit for opening or closing said control circuit including a starter switch and a safety switch, the combination therewith of a system temporarily active to restart the engine when it stalls, comprising automatic means connected with said switches and to said engine, and responsive subsequent to a condition indicative of engine stalling to shunt said safety switch and said starter switch consecutively and for a portion of the same time interval whereby said control circuit is closed automatically or by actuation of one of said switches to restart the engine.

15. In a motor vehicle, an engine and a manually controlled starting system for said engine including a starter motor, a starter motor control circuit and manually operated means in said circuit for opening and closing said control circuit including a starter switch, conditioned for operation responsive to an engine condition indicative of engine power failure, and a safety switch, the combination therewith of a system temporarily active to restart the engine when stalled, comprising automatic means for said

engine, and operated to act in response to a condition indicative of engine stalling to close said starter motor control circuit, and timer means for maintaining said automatic means active for a limited period after engine stalling and then for restoring control of said starting system to said switch means.

22. In a motor vehicle having an engine, a transmission, a control on said transmission for selecting neutral, drive, and reverse conditions for said transmission, a starting system for said engine operable with said transmission control in selected neutral, including a starter motor for said engine, a battery-powered control circuit for said starter motor, a starter switch in said circuit conditioned for operation responsive to an engine condition indicative of engine failure, and a safety switch means in said control circuit connected to be operated by said transmission control in selected positions thereof to open or close said control circuit, whereby said safety switch means is closed in selected neutral of said transmission control, the combination therewith of a system temporarily active to restart the engine when it stalls, comprising automatic means connected in said control circuit in series relation with said safety switch means and to said engine and operated to act in response to a condition indicative of engine stalling to close said starter motor control circuit in selected neutral of said transmission control, and timer means for maintaining said first mentioned means active for a limited period after engine stalling and then for restoring control of said starting system to said switch means.

23. In a motor vehicle having an engine, a transmission, a control on said transmission for selecting neutral, drive, and reverse conditions for said transmission, a starting system for said engine operable with said transmission control in selected neutral, including a starter motor for said engine, a battery-powered control circuit for said starter motor, a combined ignition and starter switch in said circuit conditioned for operation responsive to an engine condition indicative of engine failure, and a second switch means in said control circuit connected to be operated by said transmission control in selected positions thereof to open or close said control circuit, whereby said second switch means is closed in selected neutral of said transmission control, the combination therewith of a system temporarily active to restart the engine when it stalls, comprising automatic means connected in said control circuit in series relation with said combined ignition and starter switch and to said engine, and operated to act in response to a condition indicative of engine stalling to close said starter motor control circuit on closing of said combined ignition and starter switch, and timer means for maintaining said automatic means active for a limited period after engine stalling and then for restoring control of said starting system to said switch means.

24. A restarting system for a power source of a motor vehicle having a battery, a starter motor for said power source and a circuit from said battery to said motor including switch means for energizing said circuit, a device operative for opening and closing said circuit associated with said switch means and having a connection with said circuit and said power source, a means in said device energized by said power source through said connection to condition said device for operation, and a timer for said device operated by de-energization of said means to predetermine the duration of operation of said device.

25. A restarting system for a power source of a motor vehicle having a battery, a starter motor for said power source and a control circuit from said battery to said motor, a device for opening and closing said circuit having a connection with said circuit and said power source, a means in said device energized by said power source through said connection to condition said device for operation, and a timer for said device operated by de-energization of said means to predetermine the duration of closing operation of said device.

26. A restarting system for a power source of a motor vehicle having a battery, a starter motor for said power source, and a circuit from said battery to said motor including a plurality of switch means for energizing said circuit, devices operative for opening and closing said circuit associated with said switch means and having connections with said circuit and said power source, a means in said devices energized by said power source through said connections to condition said devices for operation, and a timer for said devices operated by de-energization of said means by said source to predetermine the duration of operation of said devices.

27. A restarting system for a power source of a motor vehicle having a battery, a starter motor for said power source, and a circuit from said battery to said motor including a plurality of switch means for energizing said circuit, devices operative for opening and closing said circuit associated with said switch means and having connections with said circuit and said power source, a means in said devices energized by said power source through said connections to condition said devices for operation and responsive to a condition indicative of power failure from said source to actuate said devices, and a timer for said devices operated by de-energization of said means to predetermine the duration of actuation of said devices.

References Cited in the file of this patent

UNITED STATES PATENTS

| Number | Name | Date |
| --- | --- | --- |
| Re. 22,385 | Coffey | Oct. 26, 1943 |
| 1,137,519 | Newburger | Apr. 27, 1915 |
| 1,293,569 | Stein | Feb. 4, 1919 |
| 1,386,844 | Cowen | Aug. 9, 1921 |
| 1,771,866 | Stevenson et al. | July 29, 1930 |
| 1,788,713 | Good et al. | Jan. 13, 1931 |
| 1,936,619 | Christian | Nov. 28, 1933 |
| 1,974,208 | Ferguson | Sept. 18, 1934 |
| 1,979,836 | Kryzer | Nov. 6, 1934 |
| 1,981,879 | Sayre | Nov. 27, 1934 |
| 1,981,880 | Sayre | Nov. 27, 1934 |
| 1,996,802 | Fitzgerald | Apr. 9, 1935 |
| 2,013,189 | Sayre | Sept. 3, 1935 |
| 2,064,358 | Sayre | Dec. 15, 1936 |
| 2,374,303 | Osborne | Apr. 24, 1945 |
| 2,399,542 | Collins | Apr. 30, 1946 |